United States Patent [19]

Diamantstein et al.

[11] Patent Number: 4,826,274

[45] Date of Patent: May 2, 1989

[54] OPTICAL COUPLING ARRANGEMENTS INCLUDING EMITTER AND DETECTOR PLACED INSIDE OF A HOLLOW CLOSED END REFLECTIVE WAVEGUIDE

[75] Inventors: Menachem Diamantstein, Tel Aviv; Paul Gran, Kfar Saba; Marian Berinzon; Zvi Eckstien, both of Ramat Gan; Uri Gal, Pardes Hana, all of Israel; Julie Greenberg, Cambridge, Mass.

[73] Assignee: Motorola, Inc., Schaumburg, Ill.

[21] Appl. No.: 135,894

[22] Filed: Dec. 21, 1987

[30] Foreign Application Priority Data

Dec. 24, 1986 [GB] United Kingdom ................. 8630861

[51] Int. Cl.$^4$ ........................... G02B 6/28; H01J 5/16; G02F 1/00
[52] U.S. Cl. ............................... 350/96.16; 350/96.10; 350/96.15; 350/96.32; 250/227; 455/602; 455/606
[58] Field of Search ............... 350/96.10, 96.15, 96.16, 350/96.30, 96.32, 96.11, 96.12, 96.17; 250/227; 455/600, 602, 605, 606, 610

[56] References Cited

U.S. PATENT DOCUMENTS

| | | | |
|---|---|---|---|
| 3,583,786 | 6/1971 | Marcatilli | 350/96.32 |
| 3,756,688 | 9/1973 | Hudson et al. | 350/96.16 |
| 4,450,461 | 5/1984 | Cook et al. | 350/96.15 X |
| 4,762,381 | 8/1988 | Uemiya et al. | 350/96.11 |
| 4,763,398 | 8/1988 | Huizing et al. | 350/96.10 X |
| 4,765,706 | 8/1988 | Macatilli et al. | 350/96.16 |
| 4,781,426 | 11/1988 | Baker | 350/96.16 |

FOREIGN PATENT DOCUMENTS

| | | | |
|---|---|---|---|
| 57-148437 | 9/1982 | Japan | 455/606 X |
| 58-142303 | 8/1983 | Japan | 350/96.15 X |
| 2027546 | 2/1980 | United Kingdom | 350/96.16 X |
| 2140576 | 11/1984 | United Kingdom | 350/96.15 X |

Primary Examiner—William L. Sikes
Assistant Examiner—Brian M. Healy
Attorney, Agent, or Firm—Jose W. Jimenez; Joseph P. Krause

[57] ABSTRACT

An arrangement for optically coupling separate modules forming part of a multiprocessor system comprises an air-filled substantially cylindrical optical waveguide 1 having a reflective inner wall and apertures 2 therein via which a photoemitter 3 and a photodetector 4 associated with each module can optically communicate with other photoemitters and photodetectors associated with other modules.

13 Claims, 1 Drawing Sheet

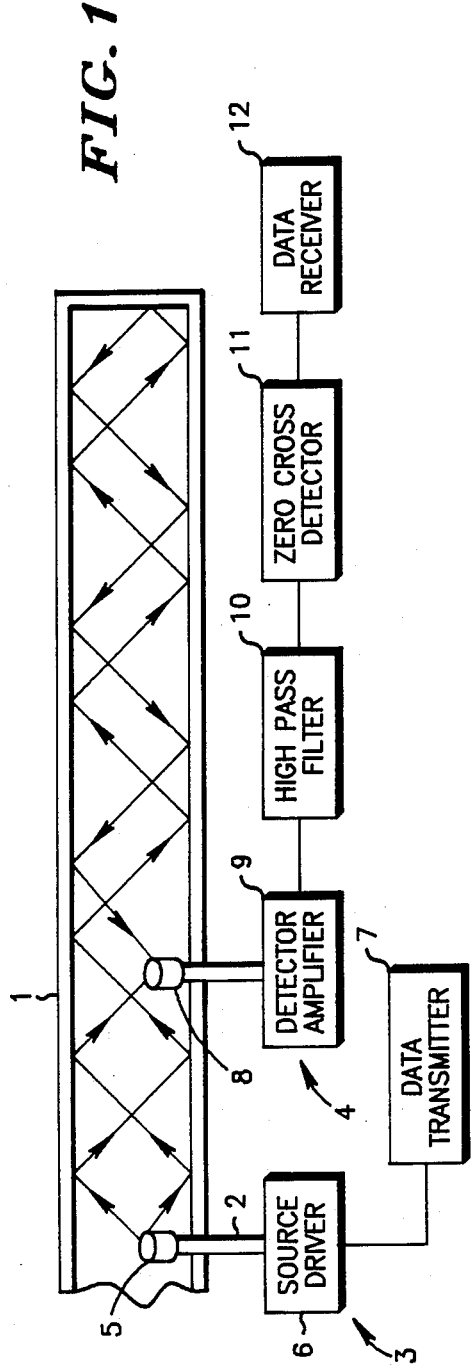
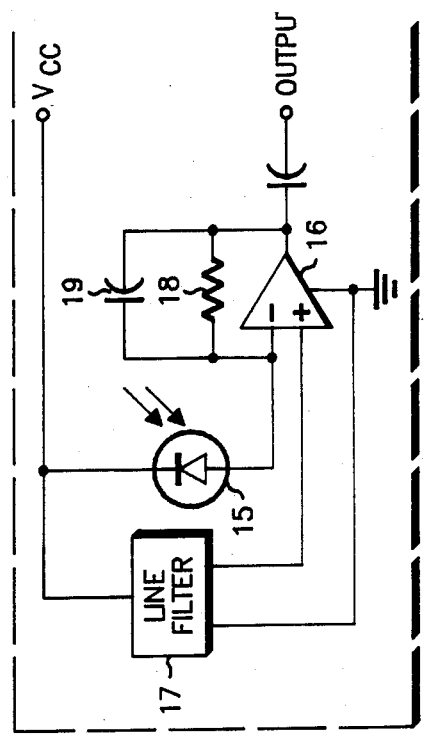
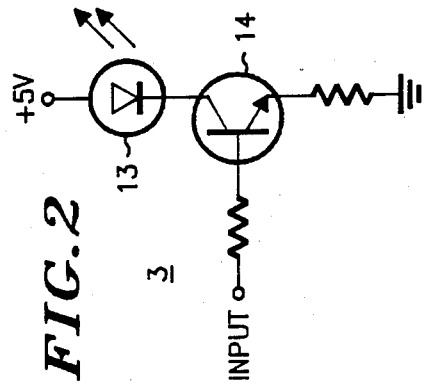

OPTICAL COUPLING ARRANGEMENTS INCLUDING EMITTER AND DETECTOR PLACED INSIDE OF A HOLLOW CLOSED END REFLECTIVE WAVEGUIDE

BACKGROUND OF THE INVENTION

This invention relates to optical coupling arrangements and more especially to such arrangements for coupling separate modules in electronic multiprocessor systems.

Such modular systems require internal communications between the separate modules. This communication generally takes place via a bus coupling the modules and has usually been via an electrically conducting bus.

In a number of applications it is desirable that the modules be in communication with each other but electrically isolated from each other so as to minimise electromagnetic induction effects. Such galvanic isolation has been achieved in the prior art in numerous ways. For example, it is known to use infrared communication, as in a TV remote control system, or to use optical communication as in some types of personal computer keyboards.

It is well known to use optical communication as a means of electrically isolating separate modules and this communication has hitherto been achieved via optical fibers.

In one such system a multi-drop optical fiber is used as a bus with directional couplers inserted at every drop point transmitting the signal to each photodetector.

Such optical fiber buses are however difficult to alter since their configurations are fixed by the number of directional couplers provided.

SUMMARY OF THE INVENTION

It is an object of the present invention to provide a simple and convenient means for coupling separate modules in electronic multimodule systems.

Accordingly, the invention provides an optical coupling arrangement for an electronic multimodule system of the type having a plurality of separate modules in communication with each other, the arrangement comprising a substantially cylindrical optical waveguide having a plurality of openings in the wall thereof via which a photoemitter and a photodetector associated with each of said separate modules can emit and receive optical signals passing through the waveguide.

The optical waveguide may be solid or air-filled and is preferably covered with an internally highly reflective material.

Preferably there is one photoemitter and one photodetector associated with each module. Each module may comprise a printed circuit board and the plurality of modules are preferably enclosed within a cage.

In order for a plurality of cages to communicate, one module in each cage is preferably an interface module which further comprises at least one fiber optic link for coupling the interface module to an interface module in at least one adjacent cage.

In one embodiment of the invention, at least one photoemitter and one photodetector are positioned within the optical waveguide although it is also possible for all the photoemitters and photodetectors to be positioned outside the waveguide and to emit and receive signals via openings in the waveguide.

The photoemitter and photodetector are preferably positioned within the waveguide by means of a housing fastened to the module. The photoemitter and photodetector are conveniently positioned to face lengthwise along the waveguide so that optical signals are emitted towards one end of the waveguide and the photodetector has its sensitive area facing the same end of the waveguide.

Desirably, the photoemitter is positioned so as to emit the optical signal at an angle of 10 degrees below the axis of the waveguide. All the modules are preferably positioned with their associated photoemitters and photodetectors facing the same end of the waveguide.

Each photoemitter preferably comprises a source, such as a light emitting diode, and a source driver. The light emitting diode is conveniently driven by a current flow which is controlled by a transistor whose control electrode is coupled to a data input.

Each photodetector preferably comprises a detector, such as a photodiode, and a detector amplifier. The photodetector preferably also comprises a high-pass filter and a zero-cross detector. The detector and detector amplifier are conveniently shielded from electromagnetic interference.

BRIEF DESCRIPTION OF THE DRAWINGS

One embodiment of an optical coupling arrangement according to the invention will now be more fully described by way of example with reference to the drawings of which:

FIG. 1 is a block diagram of an optical coupling arrangement according to the invention;

FIG. 2 is a circuit diagram of a photoemitter for use in the arrangement of FIG. 1; and FIG. 3 is a circuit diagram of a photodetector for use in the arrangement of FIG. 1.

DETAILED DESCRIPTION OF THE INVENTION

As shown in FIG. 1, an optical coupling arrangement according to the invention comprises an optical waveguide 1 which consists of an air-filled tube or pipe coated on the inside with reflective material so as to enable optical signals to pass along the waveguide due to reflection from the sides thereof. The waveguide 1 has a number of apertures 2 in its wall for enabling photoemitters 3 and photodetectors 4 to be positioned in the waveguide and thus to emit and receive optical signals passing along the waveguide.

Each photoemitter 3 comprises a source 5 and a source driver 6 which is coupled to a data transmitter 7 forming part of one module of an electronic multiprocessor system. Each photodetector 4 comprises a detector 8, a detector amplifier 9, a high-pass filter 10 and a zero cross detector 11 coupled to a data receiver 12 also forming part of a module of an electronic multiprocessor system.

As shown in FIG. 2, the photoemitter 3 is formed from an infrared light emitting diode 13 coupled in series with a transistor 14. The input from the data transmitter is then passed to the control electrode of transistor 14 which thus switches between a conducting and a non-conducting state to allow current to flow through the diode 13. The diode 13 radiates when the input signal is a logical one and is not radiating when the input is zero. An open collector gate may be used in place of the discrete transistor 14.

FIG. 3 shows a circuit diagram of part of the photodetector 4. A silicon PIN photodiode 15 is coupled between a supply terminal Vcc and one input of a transimpedance amplifier 16, the other input of the amplifier being coupled to a reference voltage provided from the supply terminal via a filter 17. A feedback loop consisting of a resistor 18 and a capacitor 19 coupled in parallel acts to limit transient variations in the input.

The output from the amplifier is then passed to the high-pass filter and zero-cross detector as mentioned above.

It will be apparent that the source 5 should have a high efficiency of radiation and a large aperture angle. The detector 8 should have a large receiving area and a rise/fall time an order of magnitude faster than the communication rate.

When the present optical coupling arrangement is used for communicating between printed circuit boards, each board has its own source and detector and the assembly is enclosed within a cage. Insertion of a board into the cage automatically positions the source and detector in place with respect to the optical waveguide. The detector and source may be positioned on a part of the board that extends into the waveguide but it is not necessary for the source and detector to actually enter the waveguide as light may enter or leave the waveguide effectively via suitable apertures. The detector and its amplifier should, of course, be shielded against electromagnetic interference.

It will be apparent that such a system may be expanded to provide a means for a theoretically infinite number of modules to communicate, overcoming restraints on the number of modules due to cage size or physical characteristics of the waveguide.

In such an expanded configuration, the system consists of any number of modules, residing in multiple cages. Within each cage, the modules communicate via the optical waveguide as previously described. One module in each cage is designated as an interface module. An interface module contains two fiber optic links (each link consisting of one fiber optic transmitter and one fiber optic receiver), in addition to the photoemitter and photodetector previously defined. Each fiber optic link is used to connect the interface module to the interface module within an adjacent cage.

Via its fiber optic links, the interface module transmits all communication which originates in its cage, i.e., all signals received from the optical waveguide are transmitted to both fiber optic links. Furthermore, the interface module relays to an adjacent cage all communication received from the other adjacent cage, i.e., all signals received from one fiber optic link are transmitted to the second fiber optic link. And finally, the interface module relays communication to the other modules in its cage, i.e., all signals received from both fiber optic links are transmitted via the interface module's photoemitter to the optical waveguide within the cage.

We claim:

1. An optical coupling arrangement for an electronic multi-module system, said multi-module system having a plurality of separate modules in communication with each other, said optical coupling arrangement comprised of:

a substantially cylindrical, hollow, optical waveguide having a plurality of openings in the wall thereof and having at least one end covered by an internally highly reflective material; and a photoemitter and photodetector associated with each of said separate modules for emitting and receiving, respectively, light signals via the waveguide; wherein the photoemitter is positioned within the waveguide for emitting light signals in one direction along the waveguide towards said one end thereof, and the photodetector is also positioned within the waveguide for receiving light signals passing in the other direction along the waveguide after having been reflected from said one end, both the photoemitter and photodetector being coupled to a respective module via respective openings in the wall of the waveguide.

2. An optical coupling arrangement according to claim 1 comprising one photoemitter and one photodetector associated with each module.

3. An optical coupling arrangement according to claim 1 wherein the waveguide is air-filled.

4. An optical coupling arrangement according to claim 1 wherein said waveguide is covered with an internally highly reflective material.

5. An optical coupling arrangement according to claim 2 wherein each photodetector comprises a photodiode coupled to a detector amplifier.

6. An optical coupling arrangement according to claim 5 wherein said photodiode and said detector amplifier are shielded from electromagnetic interference.

7. An optical coupling arrangement according to claim 5 wherein each photodetector further comprises a high-pass filter and a zero-cross detector.

8. An optical coupling arrangement according to claim 2 wherein each photoemitter comprises a source and a source driver.

9. An optical coupling arrangement according to claim 8 wherein said source is a light emitting diode.

10. An electronic multi-module system comprising of a plurality of separate modules in communication with each other by means of an optical coupling arrangement, said optical coupling arrangement comprising:

a substantially cylindrical, hollow, optical waveguide, having a plurality of openings in the wall thereof and having one end covered by an internally highly reflective material;

and a photoemitter and photodetector associated with each of said separate modules for emitting and receiving respectively, light signals via the waveguide; wherein the photoemitter is positioned within the waveguide for emitting light signals in one direction along the waveguide toward said one end thereof, and the photodetector is also positioned within the waveguide for receiving light signals passing in the other direction along the waveguide after having been reflected from said one end, both the photoemitter and photodetector being coupled to a respective module via respective openings in the wall of the waveguide.

11. An electronic multimodule system according to claim 10 wherein said plurality of modules are enclosed within a cage.

12. An electronic multimodule system according to claim 11 wherein one of said modules further comprises at least one fiber optic link for coupling the module to a similar module in a different cage.

13. An electronic multimodule system according to claim 10 wherein at least one of the modules comprises a printed circuit board.

* * * * *